(12) United States Patent
Sironi et al.

(10) Patent No.: US 11,303,804 B2
(45) Date of Patent: Apr. 12, 2022

(54) METHOD AND APPARATUS OF PROCESSING A SIGNAL FROM AN EVENT-BASED SENSOR

(71) Applicant: PROPHESEE, Paris (FR)

(72) Inventors: Amos Sironi, Questembert (FR); Marc Rousseau, Bois-le-Roi (FR); Christoph Posch, Bad Fischau (AT); Xavier Lagorce, Saint-Maur-des-Fosses (FR)

(73) Assignee: PROPHESEE, Paris (FR)

( * ) Notice: Subject to any disclaimer, the term of this patent is extended or adjusted under 35 U.S.C. 154(b) by 0 days.

(21) Appl. No.: 16/963,944

(22) PCT Filed: Jan. 25, 2019

(86) PCT No.: PCT/EP2019/051919
§ 371 (c)(1),
(2) Date: Jul. 22, 2020

(87) PCT Pub. No.: WO2019/145516
PCT Pub. Date: Aug. 1, 2019

(65) Prior Publication Data
US 2021/0044744 A1    Feb. 11, 2021

(30) Foreign Application Priority Data

Jan. 26, 2018  (EP) ..................................... 18305063
Aug. 29, 2018  (EP) ..................................... 18191469

(51) Int. Cl.
*H04N 5/232*  (2006.01)
*H04N 5/225*  (2006.01)
*H04N 5/341*  (2011.01)

(52) U.S. Cl.
CPC ....... *H04N 5/23227* (2018.08); *H04N 5/2257* (2013.01); *H04N 5/341* (2013.01)

(58) Field of Classification Search
CPC .. H04N 5/23227; H04N 5/2257; H04N 5/341; H04N 5/351; H04N 5/335; G06T 7/263
See application file for complete search history.

(56) References Cited

U.S. PATENT DOCUMENTS

2013/0141554 A1  6/2013 Ganick et al.
2017/0053407 A1  2/2017 Benosman et al.

OTHER PUBLICATIONS

Clady et al., "Asynchronous visual even-based time-to-contact," Frontiers in Neuroscience, Feb. 7, 2014, vol. 8, 10 pages.
Lichtsteiner et al., "A 128×128 120 dB 15 μs Latency Asynchronous Temporal Contrast Vision Sensor," IEEE Journal of Solid-State Circuits, Feb. 2008, vol. 43, No. 2, pp. 566-576.
(Continued)

*Primary Examiner* — Antoinette T Spinks
(74) *Attorney, Agent, or Firm* — Faegre Drinker Biddle & Reath LLP (57) ABSTRACT

For processing a signal from an event-based sensor having an array of sensing elements facing a scene, the method comprises: receiving the signal including, for each sensing element, successive events originating from said sensing element depending on variations of incident light from the scene; analyzing the signal to detect a frequency pattern in a light profile sensed by at least one sensing element; and extracting information from the scene in response to detection of the frequency pattern.

26 Claims, 5 Drawing Sheets

(56) References Cited

OTHER PUBLICATIONS

Negre et al., "Real-time Time-To-Collision from variation of Intrinsic Scale," Experimental Robotics, Springer, Berlin, Heidelberg, 2008, IEEE 802.15.7, URL: https://hal.inria.fr/inria-00182028/document, 11 pages.

Ni et al., "Asynchronous Event-Based Visual Shape Tracking for Stable Haptic Feedback in Microrobotics," IEEE Transactions on Robotics, IEEE Service Center, Piscataway, NJ, US, Oct. 1, 2012, vol. 28, No. 5, pp. 1081-1089.

Posch et al., "A QVGA 143 dB Dynamic Range Frame-Free PWM Image Sensor With Lossless Pixel-Level Video Compression and Time-Domain CDS," IEEE Journal of Solid-State Circuits, Jan. 2011, vol. 46, No. 1, pp. 259-275.

Posch et al., "Retinomorphic Event-Based Vision Sensors: Bioinspired Cameras With Spiking Output", Proceedings of the IEEE, Oct. 2014, vol. 102, No. 10, pp. 1470-1484.

Serrano-Gotarredona et al., "A 128×128 1.5% Contrast Sensitivity 0.9% FPN 3 µs Latency 4mW Asynchronous Frame-Free-Dynamic Vision Sensor Using Transimpedance Preamplifiers," IEEE Journal of Solid-State Circuits, IEEE Service Center, Piscataway NJ, US, Mar. 1, 2013, vol. 48, No. 3, pp. 827-838.

METHOD AND APPARATUS OF PROCESSING A SIGNAL FROM AN EVENT-BASED SENSOR

CROSS-REFERENCE TO RELATED APPLICATIONS

This application is the U.S. national phase of the International Patent Application No. PCT/EP2019/051919, filed Jan. 25, 2019, which claims the benefit of European Patent Application No. 18305063.2, filed Jan. 26, 2018, and European Patent Application No. 18191469.8, filed Aug. 29, 2018, the contents of all are incorporated herein by reference.

FIELD

The present disclosure relates to machine vision, especially to a method and a system of processing a signal from an event-based sensor.

BACKGROUND

Machine vision is a field that includes methods for acquiring, processing, analyzing and understanding images for use in wide type of applications such as for example security applications (e.g., surveillance, intrusion detection, object detection, facial recognition, etc.), environmental-use applications (e.g., lighting control), object detection and tracking applications, automatic inspection, process control, and robot guidance etc. Therefore, machine vision can be integrated with many different systems.

In order to extract information from a scene, it is common to use sequences of images (frames) delivered by image sensors (i.e. video cameras). Such frame-based image sensors acquire the visual information from the scene either sequentially for each sensor element (pixel) or each pixel line/column or, in various patterns, pixel parallel, but always time-sampled at some limited frame rate.

However, in the scene to be analyzed, there might be light sources such as for example fluorescent lights, compact fluorescents, light emitting diode (LED) lights, television screens, movie projectors, or computer screens that are flickering, either because of the way they are powered (for instance, fluorescent lights flicker at twice the AC power frequency) or because of they are driven with periodic pulsed signals at frequencies indiscernible for the human eye, to control their light output or power consumption (like, e.g., many LED light sources).

This is a problem for frame-based video capture where different and unrelated frame acquisition frequencies and light frequency patterns interfere, as well as different light duty cycles and exposure times. As a consequence, such frequency patterns can make a light source appear different in different frames, e.g. being ON in some frames and appearing OFF in others.

This problem is more serious for the machine vision applications, which are based on reliable capture of information from or at least in presence of artificial light sources. For example, in automotive applications (driver assistance, autonomous driving), it is useful to capture the status of traffic lights (which oftentimes use LED sources), road signs, break and tail lights of other cars, etc. at all times without interruptions or uncertainties. Automotive image and video capture is particularly affected. Due to high dynamic range requirements, often multi-exposure image sensors that execute multiple exposures at different exposure times for each final image frame are used.

Furthermore, due to the combination of nonuniform light source frequency patterns and complex image information sampling processes (with different shutter time combinations), for frame-based sensors, the state of the light source can evolve through the frames in unexpected ways, causing artefacts like seeing only half of the digits of a speed limit sign or receiving wrong color information from a traffic light. Great effort is put on the development of frame-based image sensors that are able to suppress the described effects of light frequency patterns and make the sensor output appear as if it would look at an unmodulated static light source. However, due to the characteristics of frame-based sensors, it is generally difficult to capture accurate information, especially from modulated light.

A new event-based machine vision paradigm is developed. Instead of capturing an image with all the pixels at the same time and trying to compensate for the artifacts and suppress information, an event-based image sensor acquires the temporal luminance profile sensed by each pixel from the scene viewed by the sensor. Event-based sensors can capture fast changing information in a visual scene due to the high temporal resolution of the information individually acquired by the pixels. More details of such an event-based machine vision technology is discussed in the article Posch, C., Serrano-Gotarredona, T., Linares-Barranco, B., & Delbruck, T. (2014), "Retinomorphic event-based vision sensors: bioinspired cameras with spiking output", Proceedings of the IEEE, 102(10), 1470-1484.

Accordingly, an object is to provide a new approach of capturing information from scenes viewed by event-based sensors.

SUMMARY

A method of processing a signal from an event-based sensor is provided. The event-based sensor having an array of sensing elements facing a scene, the method comprises: receiving the signal including, for each sensing element, successive events originating from said sensing element depending on variations of incident light from the scene; detecting a frequency pattern in a light profile sensed by at least one sensing element by analyzing the said signal; and extracting information from the scene in response to detection of the frequency pattern.

A frequency pattern, which may be perceived as flicker, is not eliminated but captured from the output of the event-based sensor in order to be exploited to extract some useful information. The extracted information may be encoded beforehand, or natively present in the scene observed by the array of sensing elements. The method takes advantage of flickering effects, rather than dismissing them as undesirable.

In a method according to an embodiment, the event-based sensor has an array of sensing elements facing a scene, and each event may comprise a time of occurrence and a luminance attribute corresponding to a variation of incident light. The method can be used to analyze the signal through steps including:

extracting from the signal successive bursts of events originating from at least one sensing element, each burst consisting of events having luminance attributes that correspond to variations of incident light of a same direction; and detecting a frequency pattern based on timing of the successive bursts.

Such a method of analyzing the signal has an application to extract information from the scene, using the detected frequency pattern(s), as mentioned above. However, other applications exist, for example for cancelling frequency-modulated components, or flickering effects, from the signal for further processing or display.

A burst may be extracted from the signal by counting a preset number of events originating from a same sensing element, having luminance attributes that correspond to variations of incident light of a same direction.

In an embodiment, analyzing the signal further comprises filtering events received in the signal, the successive bursts of events being extracted from the signal after filtering. The filtering comprises, upon receiving a new event originating from a sensing element of the event-based sensor:

discarding the new event if the time of occurrence of the new event is more than a memorized time of occurrence of a preceding event from the same sensing element plus a time threshold;

discarding the new event if the luminance attribute of the new event and a memorized luminance attribute of the preceding event from the same sensing element correspond to variations of incident light of opposite sign; and memorizing the time of occurrence and the luminance attribute of the new event for filtering a next event from the same sensing element.

Extracting a burst of events having a polarity corresponding to a direction of variation of incident light may comprise, for a group of N sensing elements, where N is an integer equal to or greater than 1, incrementing an event counter when the filtered signal has a new event originating from a sensing element of the group with a luminance attribute that corresponds to the polarity of the burst. The burst can then be extracted when the event counter reaches a threshold. Extracting the burst of events having the polarity may further comprise, when the event counter reaches the threshold, changing the polarity for extraction of a next burst of events. In some implementations, extracting the burst of events comprises resetting the event counter when the signal has a new event originating from a sensing element of the group with a luminance attribute that does not correspond to the polarity of the burst. The event counter may also be reset if the event counter does not reach the threshold within a given time slice.

In an embodiment, detecting the frequency pattern comprises determining first time intervals between consecutive bursts consisting of events having luminance attributes that correspond to variations of incident light of a same direction; and performing statistical analysis of the first time intervals to decide whether the successive bursts indicate a frequency pattern.

When it is decided that the successive bursts indicate a frequency pattern, detecting the frequency pattern may further comprise estimating a frequency of the frequency pattern based on the first time intervals. It is also possible to estimate a duty cycle of the frequency pattern based on second time intervals determined between consecutive bursts consisting of events having luminance attributes that correspond to variations of incident light of opposite directions.

Some embodiments of the method may use of a kind of spatial filtering of the signal from the event-based sensor after detecting the frequency pattern. Such an embodiment comprises determining a spatial region of the scene where the same frequency and/or duty cycle is detected, and ignoring the spatial region if a size of the spatial region exceeds a defined size.

In an application of the method to the transmission of information, extracting information may comprise demodulating frequency patterns detected in the scene. For example, the frequency patterns may be demodulated by referring to On-Off keying (OOK), or Manchester coding.

The information extracted from the scene may output with location information relating to an address, in the array, of at least one sensing element where the frequency pattern is detected.

Another aspect of an embodiment relates to an apparatus for extracting information from a scene, comprising: an array of sensing elements to be placed in front of the scene; and at least one processor coupled with the array of sensing elements and configured to perform a method as mentioned above.

Yet another aspect of an embodiment relates to a computer program comprising program code to be executed by a processor coupled with an array of sensing elements, the program code being adapted to performance of a method as mentioned above when executed by the processor.

BRIEF DESCRIPTION OF THE DRAWINGS

Other features and advantages of the present disclosure will appear in the description hereinafter, in reference to the appended drawings, where.

DETAILED DESCRIPTION

Figure 1:
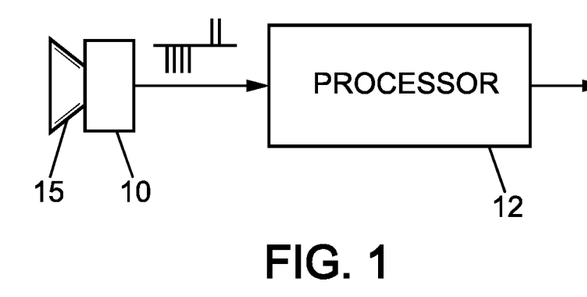
FIG. 1 is a block diagram of a device according to an embodiment.

The apparatus shown in FIG. 1 comprises an event-based asynchronous vision sensor 10 placed facing a scene and receiving the light flow of the scene through optics for acquisition 15 comprising one or several lenses. The sensor 10 is placed in the image plane of the optics for acquisition 15. It comprises an array of sensing elements, such as photosensitive elements, organized into a matrix of pixels. Each sensing element corresponding to a pixel produces successive events depending on variations of light in the scene.

A processor 12 processes the information originating from the sensor 10, i.e. the sequences of events received asynchronously from the various pixels, in order to extract therefrom information included in the scene. It can be implemented by programming using a suitable programming language. A hardware implementation of the processor 12 using specialized logic circuits (ASIC, FPGA, ...) is also possible.

For each sensing element, the sensor 10 generates an event-based signal sequence depending on the variations of light received by the sensing element from the scene that appears in the field of vision of the sensor.

The asynchronous sensor 10 carries out an acquisition to output a signal which, for each pixel, may be in the form of a succession of instants $t_k$ (k=0, 1, 2, ... ) at which an activation threshold Q is reached. Each time this luminance increases by a quantity equal to the activation threshold Q starting from what it was in time $t_k$, a new instant $t_{k+1}$ is identified and a spike is emitted at this instant $t_{k+1}$. Symmetrically, each time that the luminance observed by the sensing element decreases by the quantity Q starting from what it was in time $t_k$, a new instant $t_{k+1}$ is identified and a spike is emitted at this instant $t_{k+1}$. The signal sequence for the sensing element includes a succession of spikes positioned over time at instants $t_k$ depending on the light profile for the sensing element. The output of the sensor 10 is then in the form of an address-event representation (AER). In addition, the signal sequence typically includes a luminance attribute corresponding to a variation of incident light.

The activation threshold Q can be fixed, or can be adapted as a function of the luminance. For example, the threshold can be compared to the variations in the logarithm of the luminance for generating events when exceeded.

By way of example, the sensor 10 can be a dynamic vision sensor (DVS) of the type described in "A 128×128 120 dB 15 μs Latency Asynchronous Temporal Contrast Vision Sensor", P. Lichtsteiner, et al., IEEE Journal of Solid-State Circuits, Vol. 43, No. 2, February 2008, pp. 566-576, or in patent application US 2008/0135731 A1. The dynamics of a retina (minimum duration between the action potentials) can be approached with a DVS of this type. The dynamic behavior surpasses that of a conventional video camera that has a realistic sampling frequency. When a DVS is used as the event-based sensor 10, data pertaining to an event originating from a sensing element include the address of the sensing element, a time of occurrence of the event and a luminance attribute corresponding to a polarity of the event, e.g. +1 if the luminance increases and −1 if the luminance decreases.

Another example of an asynchronous sensor 10 that can be used advantageously in the context of an embodiment is the asynchronous time-based image sensor (ATIS) of which a description is given in the article "A QVGA 143 dB Dynamic Range Frame-Free PWM Image Sensor With Lossless Pixel-Level Video Compression and Time-Domain CDS", C. Posch, et al., IEEE Journal of Solid-State Circuits, Vol. 46, No. 1, January 2011, pp. 259-275. When an ATIS is used as the event-based sensor 10, data pertaining to an event originating from a sensing element include the address of the sensing element, a time of occurrence of the event and a luminance attribute corresponding to an estimated value of the absolute luminance. The luminance attribute in the ATIS also includes the temporal contrast event polarity.

According to special embodiment, the present disclosure aims at detecting frequency patterns in the scene viewed by the event-based sensor 10.

Figure 2:
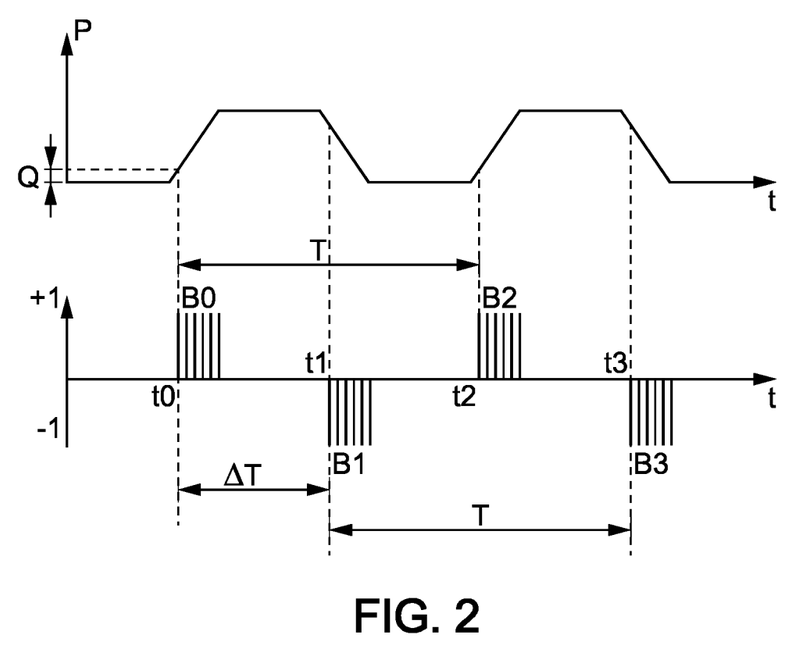
FIG. 2 shows an example of a light profile received by an asynchronous sensor and a signal generated by the asynchronous sensor in response to the light profile.

By way of illustration, FIG. 2 shows, with arbitrary scales, an example of light profile P which may be seen by a sensing element when there is some frequency pattern in the luminance, and an example of signal generated by a sensor of the DVS type for such sensing element.

The light profile P seen by the sensing element includes a frequency pattern which, in the simplified example shown for the explanation, has alternating rising and falling edges with a periodicity of T, i.e. a frequency of f=1/T. At t0, when the luminance increases by a quantity equal to the activation threshold Q, an event is generated by the sensing element. The event has a time of occurrence t0 and a luminance attribute, i.e. polarity in the case of a DVS (level +1 at t0 in FIG. 2). With the increase of the luminance in the rising edge, subsequent events with the same positive polarity are generated each time the luminance further increases by the activation threshold. These events form a burst denoted as B0 in FIG. 2. When the falling edge starts, the luminance decreases and gives rise to another burst B1 of events of opposite polarity, i.e. negative polarity (level −1), from time t1. Further rising and falling edges in the luminance sensed by the sensing element produce other bursts of positive spikes, such as B2 from time t2, and other bursts of negative spikes, such as B3 from time t3.

The diagram in the lower part of FIG. 2 is shown in the illustrative case of a DVS sensor.

Figure 3:
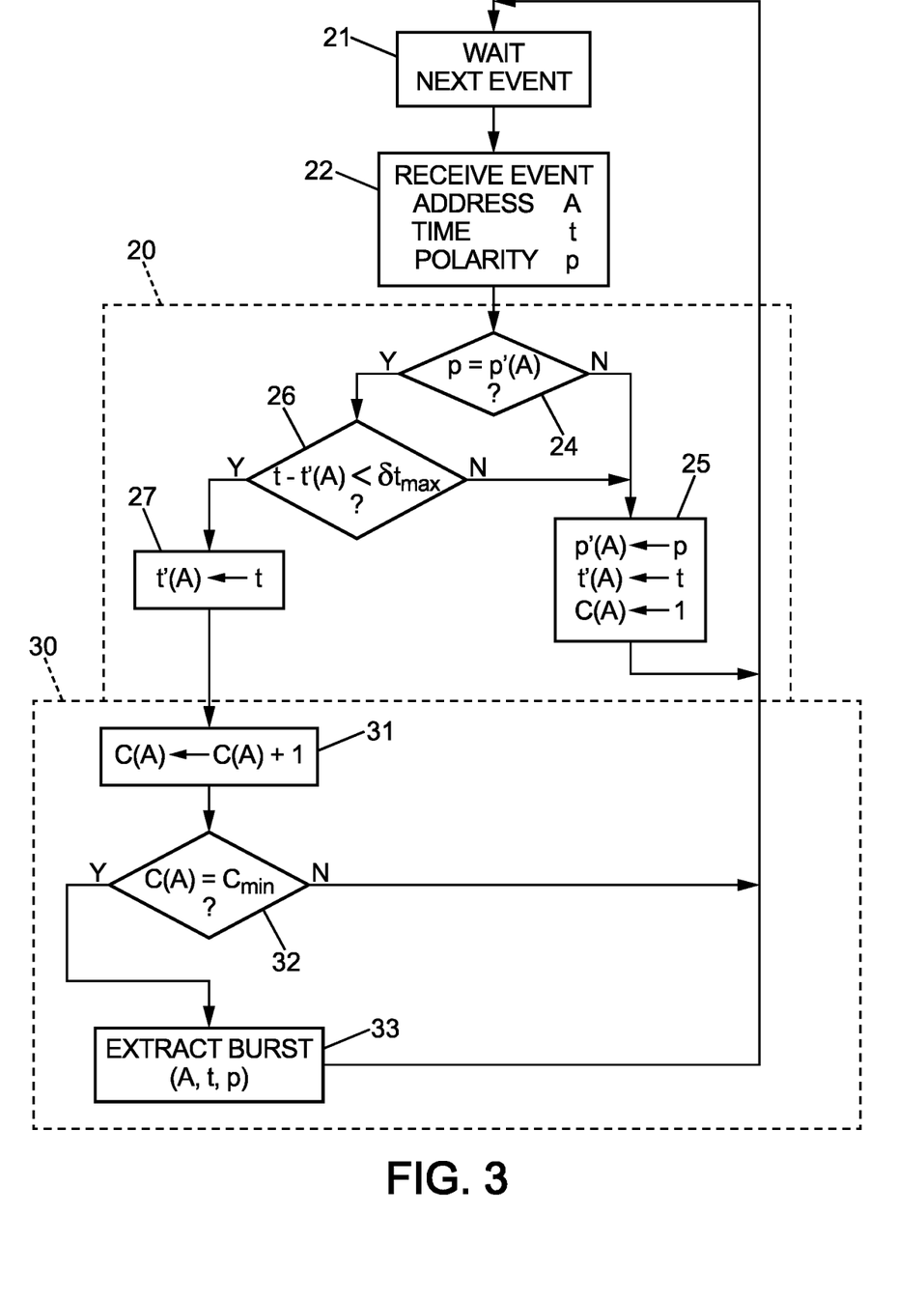
FIG. 3 is a flowchart of an illustrative process for detecting bursts of events.

FIG. 3 shows a flow chart of an illustrative process for detecting bursts of events which can be used in various implementations. The following notations are used in the figure:

A: address of a current event, identifying its location in the matrix of pixels of the sensor 10;

t: time of occurrence of the current event;

p: polarity of the current event, e.g. p=+1 if the sensed luminance is increasing and p=−1 if the sensed luminance is decreasing;

t'(A): time of occurrence of the latest event indicated by the sensing element at address A;

p'(A): polarity of the latest event indicated by the sensing element at address A. p'(A) also denotes the polarity of a burst of events which is being extracted;

$\delta t_{max}$: a preset time threshold;

C(A): an event counter for the pixel address A.

The process shown in FIG. 3 includes a filtering operation 20 which is carried out upon receipt of each event from the array of sensing elements, followed by a burst extraction stage 30. The processor 12 waits for new events (step 21) and upon receipt of an event with parameters A, t, p at step 22, starts the filtering operation 20.

The filtering operation 20 includes steps 24-27 performed pixel-wise. First, the polarity p of the received event is compared with that p'(A) of the preceding event from the same pixel. If p≠p'(A) (test 24), the event may be spurious (for the purpose of detecting frequency patterns) or denote the onset of a rising or falling edge of the luminance profile. The event for which p≠p'(A) is discarded and, before returning to step 21 of waiting for the next event from the sensor 10, the parameters p'(A), t'(A) and C(A) are reset to take the values p, t and 1, respectively, at step 25. If p=p'(A) at test 24, another test 26 is performed to compare the times of occurrence t, t'(A) of the current and preceding events with respect to the time threshold $\delta t_{max}$. If t−t'(A) $\delta t_{max}$, it is considered that the time elapsed since the preceding event is too long for both events to be part of a rising or falling edge of the luminance profile. In this case, the filtering operation 20 proceeds to the above-mentioned resetting step 25. Otherwise, if t−t'(A)<$\delta t_{max}$, the current event is kept in the stream of events and, optionally, its time of occurrence t is memorized as the parameter t'(A) at step 27 in view of processing the next event at the same address A.

In the embodiment illustrated in FIG. 3, the burst extraction stage 30 is also performed pixel-wise. After step 27, the event which has just been kept is taken into account by incrementing the event counter C(A) for the pixel address A (step 31).

Then, the event counter C(A) is compared with a threshold $C_{min}$ at step 32. While C(A)<$C_{min}$, no burst is extracted, and the processor 12 returns to step 21 of waiting for the next event. When C(A)=$C_{min}$ at step 32, it is determined that the signal includes a burst at address A, which is extracted at step 33 by noting its address A, time t and polarity p. In this preferred example where step 27 is used, timing of the extracted burst is denoted by the time of occurrence t of its $C_{min}$-th event (if) occurring with time intervals that do not exceed $\delta t_{max}$. It is noted that the parameters of the burst extracted at step 33 are produced in an event-based manner, using AER.

The preset parameters $\delta t_{max}$ and $C_{min}$ are chosen depending on factors such as the dynamics of the event-based sensor 10 which is used, and requirements of the application run by the processor 12 including frequency ranges to be detected. By way of example and without limitation, $\delta t_{max}$ may be in a range of 0.1 to 50000 μs and $C_{min}$ may be between 2 and 10.

After extracting a burst at step 33, the process returns to the waiting step 21. Another option (not shown) is that, after extracting the burst at step 33, the event counter C(A) is reset and the polarity p'(A) is changed (to −p) for subsequent extraction of a next burst of events, before returning to the waiting step 21.

In an alternative embodiment, the filtering stage 20 is not used before the burst extraction stage 30. In this case, the events are processed in stage 30 in the case where they have the same polarity as the current burst, namely p=p'(A).

Figure 4A:
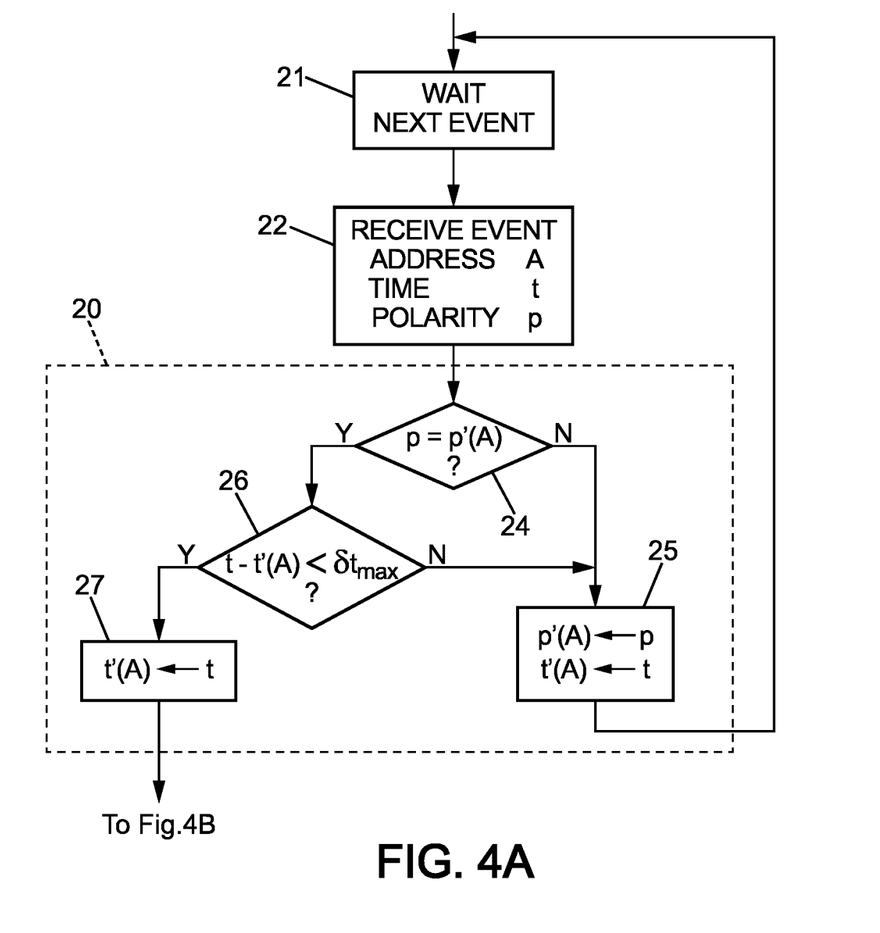
FIGS. 4A-B are flowcharts of an alternative process for detecting bursts of events.
Figure 4B:
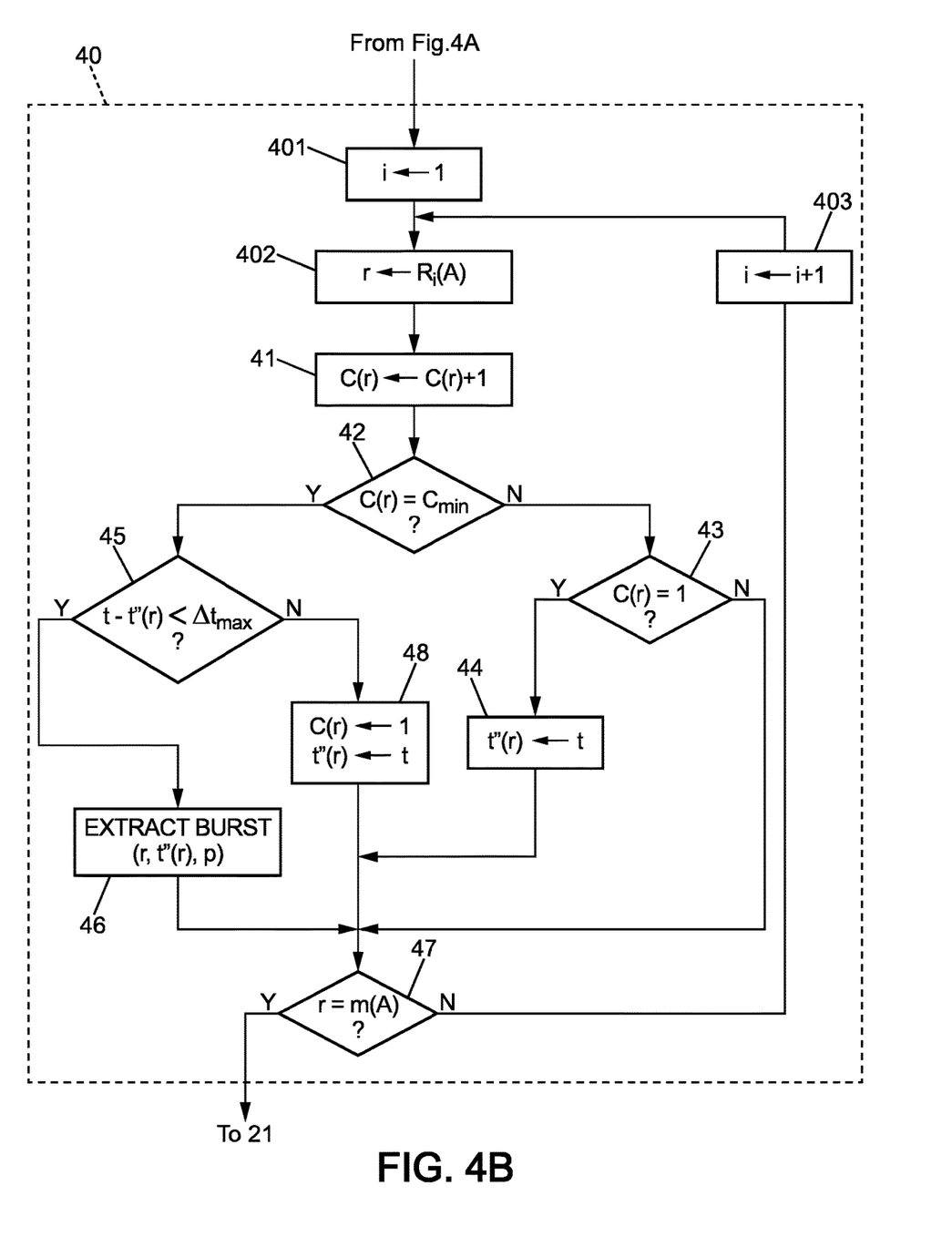

FIG. 4, formed by combining FIGS. 4A and 4B, illustrates an alternative embodiment of the process for detecting bursts of events. The notations are the same as in FIG. 3. However, there is an additional parameter $\Delta t_{max}$ representing a time slice in which consecutive events of a same polarity must fall for a burst to be extracted. The variable t"(r) indicates the time of occurrence of the first event of a current burst in a region r.

In the example of FIGS. 4A-B, the bursts are detected over regions of the array of sensing elements. Each region is made of a group of N sensing elements. The number N is an integer at least equal to 1, which may be different from one region to another. A number of regions, typically made of adjacent sensing elements, are defined over the array. These regions may be overlapping, which means they may share some sensing elements and thus a given spike may belong to several regions. Such arrangement of regions is adapted to form a spatial pooling of data for filtering out noise.

FIG. 4A is essentially the same as the upper part of FIG. 3. The analysis of the signal comprises a stage 20 of filtering events as they are received in the signal provided by the array of sensing elements. The filtering 20 may be the same as in FIG. 3, except that it is not necessary to initialize a pixel-wise event counter at step 25. Instead, region-wise event counters C(r) are used. For each region index r, the event counter C(r) is initialized to 0 at the outset.

The burst extraction stage 40 of FIG. 4B is performed at the region level, following step 27 of FIG. 4A. If the address A for which an event is retained at step 27 belongs to a number m(A) of regions $R_i(A)$ (1≤i≤m(A)) defined over the array, a loop is performed to increment the event counters of these regions and decide whether bursts has occurred in these regions. After step 27, a first region is selected at step 401, by taking i=1, and its region index r=$R_i$(A) is derived at step 402, and then the event is taken into account by incrementing the event counter C(r) for this first region index (step 41).

Then the event counter C(r) is compared with the threshold Gin at step 42. The value of the threshold $C_{min}$ may be dependent on the size of region $R_i$(A), for example proportional to the number of sensing elements of which region $R_i$(A) is made. While C(r)<$C_{min}$ at step 42, no burst is extracted. In this case, the variable t"(r) receives the value of the time of occurrence t of the current event at step 44 if C(r)=1 at test 43. After step 44, or when C(r)>1 at test 43. The region index r is compared with the number m(A) of regions to which address A belongs at step 47. When r<m(A) at step 47, i is incremented by 1 at step 403 for taking the current event into account in the next region $R_{i+1}$(A) from step 402. When r=m(A) at step 47, the processor 12 returns to step 21 of waiting for the next event.

When C(r)=$C_{min}$ at step 42, it is checked at test 45 whether the $C_{min}$ consecutive events having the same polarity p fall within the preset time slice $\Delta t_{max}$. If t−t"(r) $\Delta t_{max}$ at test 45, no burst is extracted because it is considered that a burst cannot last so long, and then C(r) and t"(r) are reset to take the values 1 and t at step 48. When t−t"(r)<$\Delta t_{max}$ at test 45, it is determined that the signal includes a burst in region r. The burst is extracted at step 46 by noting its region index r, time t"(r) and polarity p. In this example, timing of the extracted burst is denoted by the time of occurrence t"(r) of its first event. It is noted that the parameters of the burst extracted at step 46 are produced in an event-based manner, using AER. Afterwards, the region index r is compared with the number m(A) of regions to which address A belongs at the above-described step 47.

The preset parameter $\Delta t_{max}$ is chosen depending on factors such as the dynamics of the event-based sensor 10 which is used, and requirements of the application run by the processor 12 including frequency ranges to be detected, as well as the values of $\delta t_{max}$ and $C_{min}$. By way of example and without limitation, $\Delta t_{max}$ may be in a range of 100 μs to 100 ms.

Once a number of successive bursts have been extracted for a pixel A or a region r of N pixels using a process as illustrated in FIG. 3 or 4, for example, the timing of those successive bursts can be analyzed in view of detecting a frequency pattern.

Figure 5:
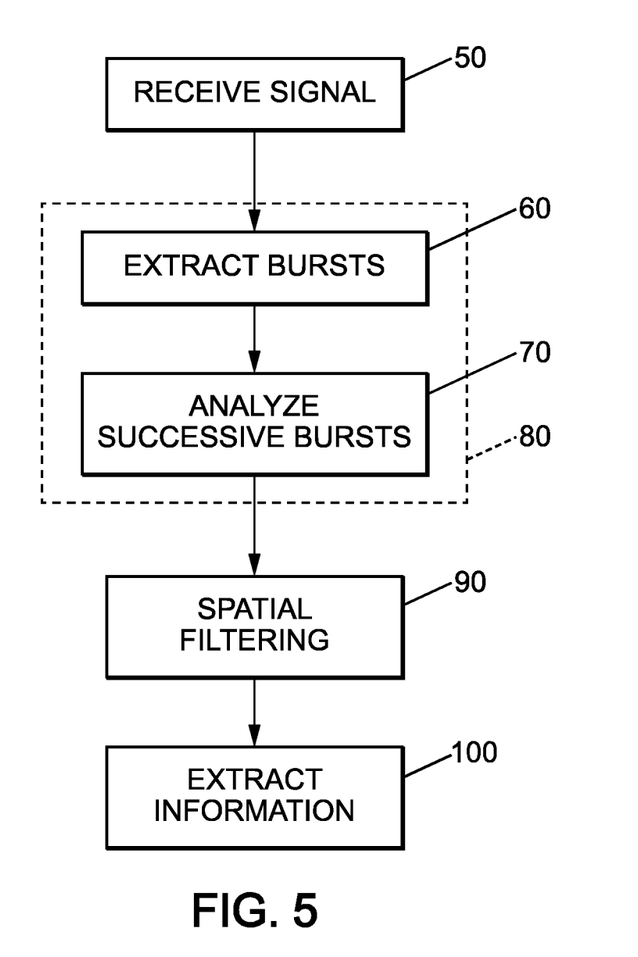
FIG. 5 is a flowchart illustrating a method according to an embodiment.

In FIG. 5, step 60 denotes the extraction of successive bursts which can be performed using a process as shown in one of FIGS. 3 and 4 on the signal received at step 50 from the event-based sensor 10, and step 70 corresponds to the analysis of the successive bursts to detect frequency patterns. Steps 60 and 70 together form the analysis step 80 applied to the received signal to detect frequency patterns therein. Once a frequency pattern is extracted at step 70, it can be exploited to extract some information available in the scene at step 100. As shown in FIG. 5, an optional spatial filtering 90 can be applied between the analysis step 80 and the step 100 of extracting information from the scene.

By way of example, when implementing the analysis step 70, some statistical analysis of time intervals between consecutive bursts consisting of events having the same polarity is performed in order to detect a frequency pattern.

For example, a buffer can be provided to store the times of successive bursts extracted in a given region (consisting of one or more sensing elements) and having a given polarity. For each polarity p=±1, the time intervals $\Delta t_1$ between consecutive bursts is noted, and their values for both polarities can be analyzed to estimate a frequency value f=1/T (see FIG. 2), for example by averaging. Such frequency value may be validated to decide that a frequency pattern is present if the standard deviation of the values $\Delta t_1$ is within a fraction (e.g. 1 to 10%) of their mean value after a number M of bursts (e.g. 3≤M≤20). Alternatively, the values of the time intervals $\Delta t_1$ for both polarities are filtered using averaging or median filtering, and it is decided that a frequency pattern is present at frequency f=1/T if a buffer of the filtered values contains more than M identical values T.

It is also possible, if a frequency pattern is detected, to estimate a duty cycle D of that frequency pattern as a further parameter describing the frequency pattern. To do this, other time intervals $\Delta t_2$ are examined. Each of the time intervals $\Delta t_2$ is between a burst of polarity p=+1 (indicating a rising edge of the light profile) and a subsequent burst of polarity p=−1 (indicating a falling edge of the light profile). The mean value, or the majority value of the time intervals over the duration for detecting the burst, provides an estimate of the time offset $\Delta T$ shown in FIG. 2. The duty cycle D can then be estimated as $D=\Delta T/T$.

Once a frequency pattern is detected and related parameters such as f, D are determined, the processor 12 has information about the location of the frequency pattern in the scene viewed by the event-based sensor 10. Such location information can be in the form of the address A of the sensing element where the pattern is detected, or in the form of an index region R. Such location information is relevant in machine vision applications, in order to determine where a source of modulated light is located.

If a plurality of frequency patterns is detected with a same frequency f in the scene viewed by the event-based sensor, it is also possible to derive a phase shift between those patterns, by analyzing the time difference between their rising edges and or their falling edges.

Optionally, after step 70 shown in FIG. 5, a further spatial filtering step 90 can be executed. In particular, when a large spatial region of the sensor is showing the same blinking pattern, i.e. same frequency and/or same duty cycle, it can be considered that such frequency pattern is not suitable for the extraction of information from the scene. For example, such large frequency patterns may come from a reflective surface such as a wall reflecting/diffusing light from some light source. In this case, the events from those sensing elements, such as pixels, are discarded in step 90, so as to be ignored in the information extraction step 100. On the contrary, when the spatial size of a frequency pattern is small, these sensing elements are considered facing a blinking light source. Therefore, the actual position of a light source can be determined. This may be useful, for example, for recognizing LED braking lights and traffic lights in automotive applications.

The information extraction step 100 is executed so as to extract information from frequency patterns in the scene by analyzing or demodulating the frequency and/or duty cycle of a modulated light.

Therefore, the method can sample the signal to find frequency patterns and extract information about the light source such as the exact times of transitions, modulation frequency, phase, duty cycle, etc. In addition, due to the autonomous functioning of the individual sensing elements, the information can be read out from the array in the form of sensing element addresses or indexes, and a detected frequency pattern associated with a light source can also facilitate determining other information about the light source in the scene.

In an alternative embodiment, the extracted information can be used to detect an object in a scene by simply recognizing the frequency pattern of the light source, such as a nominal frequency and/or duty cycle of some light source, such as traffic light, braking lights and other light sources.

Alternatively, in another embodiment, a light source can be provided to transmit some information, such as an ID, encoded in basic characteristics of the light modulation, such as frequency and/or duty cycle. In addition, the light source may also contain more sophisticated modulation of light with encoded information, so as to transmit a larger amount of information. Hence, the method disclosed herein makes it possible to use an event-based sensor 10 as a receiver for Visible Light Communication (VLC) or LiFi (see, e.g., the IEEE 802.15.7 standard).

To demodulate information transmitted using VLC, frequency patterns produced by the modulated light are extracted by the above-mentioned step 80. The information is then demodulated and extracted from these frequency patterns.

The information transmitted through VLC can be encoded or modulated by methods such as On-Off-keying (OOK) and Manchester coding. It is possible to use a set of different frequencies and/or duty cycles to code for different symbols, which enables an increase of bandwidth.

Due to the independent and autonomous operation of the pixels that respond to the light transitions, information can independently be acquired from multiple light sources in the scene and decoded separately. In that sense, an event-based sensor can be seen as a multi-channel VLC receiver where all the communicating light sources in the field of view of the sensor, such as lighting on the side of the road and VLC-modulated lights of the different cars, can be seen at the same time and independently by the sensor. The sensor does not need to be steered towards each light source provided that the sources are in the field of view. They can then be independently detected and demodulated.

In addition to visible light, the light can also be infrared or near-infrared light.

The processor 12 shown in FIG. 1 is embodied separately from the event-based sensor 10. Alternative architectures are possible. In particular, part or all of the processing illustrated in FIG. 5 can be performed in the same component as the event-based sensor 10, in an on-chip architecture. It is also possible to split the tasks between more than one processors operating sequentially or in parallel.

The above-described method may be implemented using program instructions recorded in non-transitory computer-readable media to implement various operations which may be performed by a computer. The media may also include, alone or in combination with the program instructions, data files, data structures, and the like. The program instructions recorded on the media may be those specially designed and constructed for the purposes of the illustrative embodiments, or they may be of the well-known kind and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as code produced by a compiler, and files containing higher level code that may be executed by the computer using an interpreter. The described hardware devices may be configured to act as one.

In an example of application, the apparatus including the event-based sensor 10 and the processor(s) 12 is used in an automobile to detect traffic information, such as traffic light, moving objects, etc., so as to provide traffic information to autonomous driving system.

For example, according to a special embodiment, given the pixels and the times on which a blinking pattern has been detected, pixels are grouped together according to spatial vicinity and frequency. More precisely, when the same frequency is detected for groups of pixels which are close spatially and at times within a small interval, these pixels are considered as belonging to a consistent region. Such a region in a scene is then classified as belonging to a LED light source such as traffic lights, turning lights/braking lights form a car, street lights etc. This classification is done according to the size of the extracted region, its frequency, the position in the array of pixels.

According to this embodiment, a car (or a vehicle) containing multiple blinking patterns can be detected more reliably by detecting pairs of such regions: for each detected region, another region of consistent size, phase and frequency is determined together with the first one which also lies on a horizontal line from the first region and which is not too far from it.

The relative movement and the distance from the event-based sensor of, a vehicle detected with this method can be estimated by tracking over time the pixel distance between the two regions representing two sources of blinking lights.

Assuming the separation between the two blinking sources is fixed, a distance Ds between the two regions in the scene is correlated with a distance Dv between the vehicle and the event-based sensor.

Assuming the separation between the two blinking sources is fixed, the rate of change of the distance Ds between the two regions in the scene is correlated to the relative motion. In particular the distance Ds getting smaller means the vehicle is getting further and the distance Ds getting bigger means the vehicle is getting closer. More precisely, time of contact to the object can be estimated by the ratio between the distance Dv and the derivative of the distance Dv (see for example: Negre, Amaury, et al. "Real-time time-to-collision from variation of intrinsic scale." Experimental Robotics. Springer, Berlin, Heidelberg, 2008.)

In addition, assuming the height of the light compared to the ground is fixed, its vertical position in the scene is correlated with the distance Dv between the vehicle and the camera, which is adapted to be used for single blinking light, such as single lights on motorbikes.

More generally, embodiments may be useful in a variety of devices including, without limitation, autonomous vehicles, prosthetic devices, autonomous and robotic apparatus such as manufacturing robots, military or medical robotic devices.

In an other example of application, the apparatus including the event-based sensor 10 and the processor(s) 12 is used to detect the pattern projected on objects or surfaces by a laser-light pointer, detecting a region of one or more pixels blinking at the laser frequency pattern.

Embodiments may further be applicable in a wide variety of stationary and portable devices, such as, for example, smart phones, portable communication devices, notebook, netbook and tablet computers, surveillance systems, video-projectors and practically any other computerized device configured to process vision data.

Embodiments may be used in many applications including computer human interaction (e.g., recognition of gestures, voice, posture, face, pointing devices and/or other applications), controlling processes (e.g., an industrial robot, autonomous and other vehicles), following movements of a set of interest points or objects (e.g., vehicles or humans) in the visual scene and with respect to the image plane, augmented reality applications, virtual reality applications, access control (e.g., opening a door based on a gesture, opening an access way based on detection of an authorized person), detecting events (e.g., for visual surveillance or people or animal), counting, tracking, etc. Myriads of other applications exist that will be recognized by those of ordinary skilled in the art given the present disclosure.

The embodiments described hereinabove are exemplary illustrations, and various modifications can be made to them without leaving the scope of the disclosure which stems from the annexed claims.

The invention claimed is:

1. A method of processing a signal from an event-based sensor, the event-based sensor having an array of sensing elements facing a scene, the method comprising:
    receiving the signal including, for each sensing element, successive events originating from said sensing element depending on variations of incident light from the scene;
    analyzing the signal to detect a frequency pattern in a light profile sensed by at least one sensing element; and
    extracting information from the scene in response to detection of the frequency pattern,
    wherein the events each comprise a time of occurrence and a luminance attribute corresponding to a variation of incident light,
    wherein analyzing the signal comprises:
        extracting from the signal successive bursts of events originating from at least one sensing element, each burst consisting of events having luminance attributes that correspond to variations of incident light of a same direction; and
        detecting the frequency pattern based on timing of the successive bursts,
    wherein analyzing the signal further comprises filtering events received in the signal into successive bursts of events,
    and wherein the filtering comprises, upon receiving a new event originating from a sensing element of the event-based sensor:
    assigning the new event to a new burst if the time of occurrence of the new event is more than a memorized time of occurrence of a preceding event from the same sensing element plus a time threshold;
    assigning the new event to a new burst if the luminance attribute of the new event and a memorized luminance attribute of the preceding event from the same sensing element correspond to variations of incident light of opposite sign;
    assigning the new event to the current burst otherwise; and
    memorizing the time of occurrence and the luminance attribute of the new event for filtering a next event from the same sensing element.

2. The method of claim 1, wherein a burst is extracted from the signal by counting a preset number of events originating from a same sensing element, having luminance attributes that correspond to variations of incident light of a same direction.

3. The method of claim 1, wherein extracting a burst of events having a polarity corresponding to a direction of variation of incident light comprises, for a group of N sensing elements, where N is an integer equal to or greater than 1:
    incrementing an event counter when the filtered signal has a new event originating from a sensing element of the group with a luminance attribute that corresponds to the polarity of the burst,
    the burst being extracted when the event counter reaches a threshold.

4. The method of claim 3, wherein extracting the burst of events having the polarity further comprises, when the event counter reaches the threshold, changing the polarity for extraction of a next burst of events.

5. The method of claim 3, wherein extracting the burst of events comprises resetting the event counter when the signal has a new event originating from a sensing element of the group with a luminance attribute that does not correspond to the polarity of the burst.

6. The method of claim 3, further comprising resetting the event counter if the event counter does not reach the threshold within a given time slice.

7. The method of claim 1, wherein detecting the frequency pattern comprises:
determining first time intervals between consecutive bursts consisting of events having luminance attributes that correspond to variations of incident light of a same direction; and
performing statistical analysis of the first time intervals to decide whether the successive bursts indicate a frequency pattern.

8. The method of claim 7, wherein detecting the frequency pattern further comprises, when it is decided that the successive bursts indicate a frequency pattern, estimating a frequency of the frequency pattern based on the first time intervals, and/or estimating a duty cycle of the frequency pattern based on second time intervals determined between consecutive bursts consisting of events having luminance attributes that correspond to variations of incident light of opposite directions.

9. The method of claim 1, further comprising, after detecting the frequency pattern:
determining a spatial region of the scene where the same frequency and/or duty cycle is detected;
ignoring the spatial region if a size of the spatial region exceeds a defined size.

10. The method of claim 9, further comprising, after determining the spatial region:
detecting geometry dimension of the spatial region in the scene;
calculating a distance or relative motion between a light source generating the spatial region and the event-based sensor in correlation with the detected geometry dimension.

11. The method of claim 1, wherein extracting information comprises demodulating frequency patterns detected in the scene.

12. The method of claim 1, wherein the information extracted from the scene is output with location information relating to an address, in the array, of at least one sensing element where the frequency pattern is detected.

13. A non-transitory computer-readable medium having computer code stored thereon for execution by a processor coupled with an array of sensing elements, the computer code being adapted, when executed by the processor, to process a signal from an event-based sensor comprising the array of sensing elements facing a scene, wherein processing the signal comprises:
receiving the signal including, for each sensing element, successive events originating from said sensing element depending on variations of incident light from the scene;
analyzing the signal to detect a frequency pattern in a light profile sensed by at least one sensing element; and
extracting information from the scene in response to detection of the frequency pattern,
wherein the events each comprise a time of occurrence and a luminance attribute corresponding to a variation of incident light,
wherein analyzing the signal comprises:
extracting from the signal successive bursts of events originating from at least one sensing element, each burst consisting of events having luminance attributes that correspond to variations of incident light of a same direction; and
detecting the frequency pattern based on timing of the successive bursts,
wherein analyzing the signal further comprises filtering events received in the signal into successive bursts of events,
and wherein the filtering comprises, upon receiving a new event originating from a sensing element of the event-based sensor:
assigning the new event to a new burst if the time of occurrence of the new event is more than a memorized time of occurrence of a preceding event from the same sensing element plus a time threshold;
assigning the new event to a new burst if the luminance attribute of the new event and a memorized luminance attribute of the preceding event from the same sensing element correspond to variations of incident light of opposite sign;
assigning the new event to the current burst otherwise; and
memorizing the time of occurrence and the luminance attribute of the new event for filtering a next event from the same sensing element.

14. A method of processing a signal from an event-based sensor, the event-based sensor having an array of sensing elements facing a scene, the method comprising:
receiving the signal including, for each sensing element, successive events originating from said sensing element depending on variations of incident light from the scene;
analyzing the signal to detect a frequency pattern in a light profile sensed by at least one sensing element; and
extracting information from the scene in response to detection of the frequency pattern,
wherein the events each comprise a time of occurrence and a luminance attribute corresponding to a variation of incident light, and wherein analyzing the signal comprises:
extracting from the signal successive bursts of events originating from at least one sensing element, each burst consisting of events having luminance attributes that correspond to variations of incident light of a same direction; and
detecting the frequency pattern based on timing of the successive bursts, and wherein detecting the frequency pattern comprises:
determining first time intervals between consecutive bursts consisting of events having luminance attributes that correspond to variations of incident light of a same direction; and
performing statistical analysis of the first time intervals to decide whether the successive bursts indicate a frequency pattern.

15. The method of claim 14, wherein a burst is extracted from the signal by counting a preset number of events originating from a same sensing element, having luminance attributes that correspond to variations of incident light of a same direction.

16. The method of claim 14, wherein detecting the frequency pattern further comprises, when it is decided that the successive bursts indicate a frequency pattern, estimating a frequency of the frequency pattern based on the first time intervals, and/or estimating a duty cycle of the frequency pattern based on second time intervals determined between consecutive bursts consisting of events having luminance attributes that correspond to variations of incident light of opposite directions.

17. The method of claim 14, further comprising, after detecting the frequency pattern:
  determining a spatial region of the scene where the same frequency and/or duty cycle is detected;
  ignoring the spatial region if a size of the spatial region exceeds a defined size.

18. The method of claim 17, further comprising, after determining the spatial region:
  detecting geometry dimension of the spatial region in the scene;
  calculating a distance or relative motion between a light source generating the spatial region and the event-based sensor in correlation with the detected geometry dimension.

19. The method of claim 14, wherein extracting information comprises demodulating frequency patterns detected in the scene.

20. The method of claim 14, wherein the information extracted from the scene is output with location information relating to an address, in the array, of at least one sensing element where the frequency pattern is detected.

21. A method of processing a signal from an event-based sensor, the event-based sensor having an array of sensing elements facing a scene, the method comprising:
  receiving the signal including, for each sensing element, successive events originating from said sensing element depending on variations of incident light from the scene;
  analyzing the signal to detect a frequency pattern in a light profile sensed by at least one sensing element; and
  extracting information from the scene in response to detection of the frequency pattern,
  the method further comprising, after detecting the frequency pattern:
    determining a spatial region of the scene where the same frequency and/or duty cycle is detected;
    ignoring the spatial region if a size of the spatial region exceeds a defined size.

22. The method of claim 21, wherein the events each comprise a time of occurrence and a luminance attribute corresponding to a variation of incident light, and wherein analyzing the signal comprises:
  extracting from the signal successive bursts of events originating from at least one sensing element, each burst consisting of events having luminance attributes that correspond to variations of incident light of a same direction; and
  detecting the frequency pattern based on timing of the successive bursts.

23. The method of claim 21, wherein a burst is extracted from the signal by counting a preset number of events originating from a same sensing element, having luminance attributes that correspond to variations of incident light of a same direction.

24. The method of claim 21, further comprising, after determining the spatial region:
  detecting geometry dimension of the spatial region in the scene;
  calculating a distance or relative motion between a light source generating the spatial region and the event-based sensor in correlation with the detected geometry dimension.

25. The method of claim 21, wherein extracting information comprises demodulating frequency patterns detected in the scene.

26. The method of claim 21, wherein the information extracted from the scene is output with location information relating to an address, in the array, of at least one sensing element where the frequency pattern is detected.

* * * * *